July 12, 1960

A. T. HOLDEN 2,945,226

INDICATING APPARATUS FOR RADIO NAVIGATION SYSTEMS

Filed Sept. 7, 1955

INVENTOR
ALFRED THOMAS HOLDEN

By
Walter F. Huntley
Attorney

July 12, 1960　　　A. T. HOLDEN　　　2,945,226
INDICATING APPARATUS FOR RADIO NAVIGATION SYSTEMS
Filed Sept. 7, 1955　　　　　　　3 Sheets-Sheet 2

INVENTOR
ALFRED THOMAS HOLDEN
By
Walter P. Huntley
Attorney

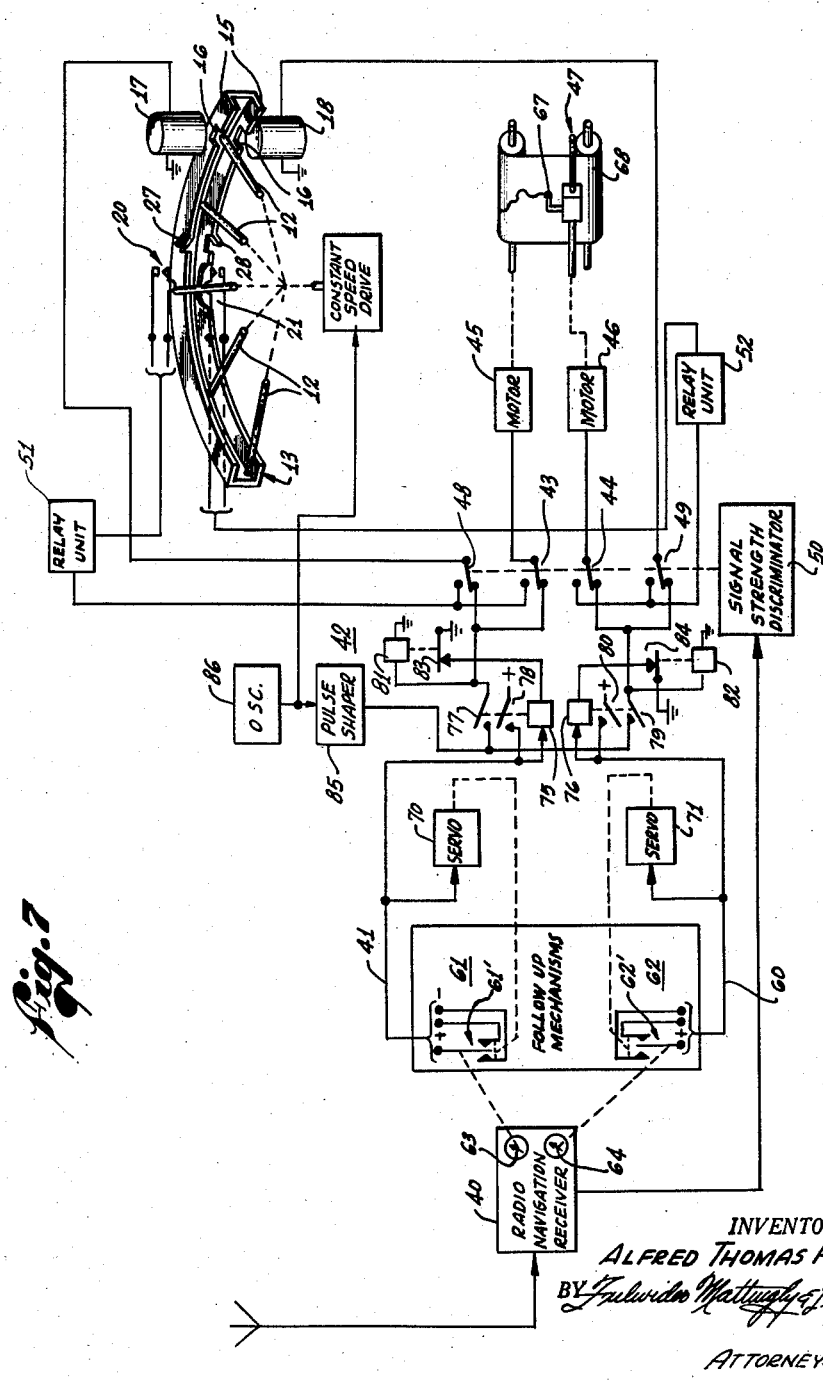

United States Patent Office 2,945,226
Patented July 12, 1960

2,945,226

INDICATING APPARATUS FOR RADIO NAVIGATION SYSTEMS

Alfred Thomas Holden, London, England, assignor to The Decca Record Company Limited, London, England, a British company Filed Sept. 7, 1955, Ser. No. 532,969

Claims priority, application Great Britain Sept. 10, 1954

16 Claims. (Cl. 343—112)

This invention relates to indicating apparatus for radio navigation systems of the kind (hereinafter referred to as indicating apparatus of the kind described) in which an index is mechanically moved relatively to a chart in two co-ordinate directions to indicate the chart position of a vehicle as determined from radio signals. In such apparatus there have to be at least two elements driven in accordance with received radio signals and means (generally electromechanical) driven by said elements for moving the index relatively to the chart in the two co-ordinate directions.

Such an indicating apparatus may, for example, be used with a phase-comparison hyperbolic radio navigation system. One form of indicating apparatus of the kind described is set forth in more detail in Patent No. 2,769,977 and it is explained in that specification that there may be more than two elements driven in accordance with received radio signals and that, for example, the movements of two elements may be combined to effect movement of the index in one of the co-ordinate directions with respect to the chart. Either the index or the chart or both may be movable in order to effect the relative movement between the two. In indicating apparatus of the kind described, if there should be any short failure of the received radio signals, then the index may not move relatively to the chart so that, when the signals are received again, the index is incorrectly positioned on the chart. In indicating apparatus in which the index movement is effected in steps, for example, by means of electrical impulses applied to a stepping motor corresponding to one or more steps of movement, such interruptions might cause errors in the position of the index. Such interruptions are generally very rare and, when they occur, only of short duration (for example an interruption might be caused by a sudden burst of severe static). It is an object of the present invention to provide means for preventing any errors due to such short interruptions of received signals. More particularly, it is an object of the present invention to provide a rate storage device for such indicating apparatus which will enable a rate of movement to be maintained over a short period. Such rate storage devices may be used for maintaining the rates of movements of the index in each of the two co-ordinate directions or they may be used for maintaining rates of movements of the input drives to the indicating apparatus.

In the following description, reference will be made to the accompanying drawings in which:

Figure 7 is a block diagram of a chart position indicating apparatus.

Referring to Figures 1 to 5 of the drawings, there is shown a rate storage device for storing information in the form of the presence or absence, at regularly recurring time intervals, of electrical pulses to act as a memory in the operation of chart-position indicating apparatus of a radio navigation system. Such a memory may be employed, for example, to keep the index moving relatively to the chart at the same rate as it has previously been moving if, for any reason, there should be a failure of input signals for effecting the movement of the index relatively to the chart in accordance with variations in the position as determined by the radio navigation system.

According to this invention the rate storage device comprises a cyclically movable carrier having a plurality of operating elements mounted so as to lie in and to be movable in planes at right angles to the direction of movement of the carrier, means for driving said carrier at a constant speed, a fixed separating guide arranged around the path of the elements, which guide, along at least part of its length, prevents movement of the elements from one side of the guide to the other, but which has a slot or the like through which the elements can be moved (by movement relative to the carrier) from one side to the other of the guide, electromagnetic means adjacent the slot arranged so that if an electric impulse is applied to the electromagnetic means, while an element is adjacent the slot on one particular side (the first side) of the guide, the element is forced to the second side of the guide, biasing means arranged so that each element, after it has passed the slot, lies on said first side of the guide unless the electromagnetic means has been energized, and a contact or contacts cooperating with the operating elements disposed in a fixed position with respect to the guide remote from the slot on one or the other side of the guide, whereby an electrical circuit is completed as each operating element on the appropriate side of the guide moves past the contact or contacts thereby producing a pulse.

Figure 1:
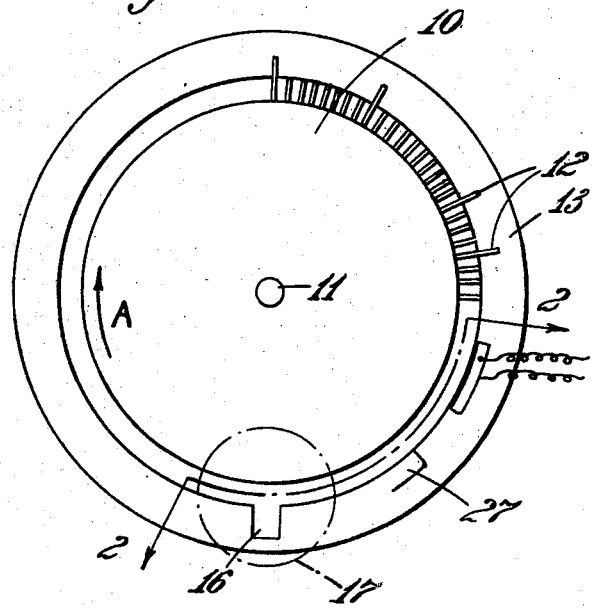
Figure 1 is a diagrammatic plan view of a rate storage device.
Figure 3:
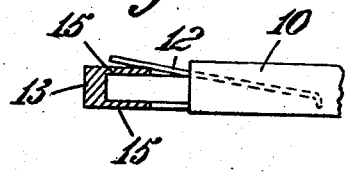
Figures 3, 4 and 5 are diagrams illustrating the possible dispositions of the operating elements with respect to the guide in the arrangement of Figures 1 and 2.
Figure 4:
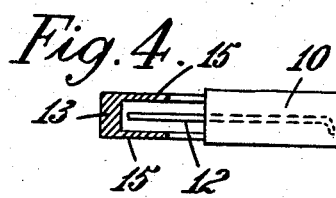
Figure 5:
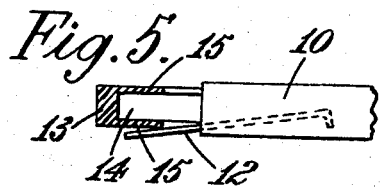

The rate storage device shown in Figures 1-5 has a disc-like member 10 mounted on a spindle 11 connected as indicated diagrammatically at 8 in Fig. 1 to a drive means 9, such as an electric motor 9, by means of which the member 10 is rotated at a uniform speed in the direction of the arrow A on Figure 1. Protruding outwardly in radial directions from the member 10 are a hundred operating elements 12 which are evenly spaced around the periphery of the member 10 and are pivotally or resiliently mounted for limited angular movement in radial planes transverse to the plane of rotation as shown in Figures 3 to 5. Surrounding the member 10 is an annular member 13 having on its inner surface a groove 14 lying between flanges 15 as shown in Figures 3 to 5. At one point in the periphery of the member 13, the upper and lower flanges 15 are formed with slots as indicated at 16 in Figures 1 and 2, the slots being of sufficient radial depth to permit of movement of the operating elements 12 through the slots so that they may be positioned on either side of the flanges 15. Adjacent the two slots 16 are arranged respectively a pair of electro-magnets 17, 18 with armatures 19, 20 positioned exactly over the slots. The elements 12 are made of ferro-magnetic material so that they may be attracted by one or other of the armatures 19, 20 when the electro-magnets 17, 18 are energised and thereby forced to the outer side of one or other of the flanges 15, according to which magnet is energised, and hence made to continue their rotational movement on the outer side of the flange as shown in Figures 3 and 5.

Situated at points on the periphery of the member 13 at nearly a complete revolution away from the slots 16 (considered in the direction of relative movement of the elements 12) are two sets of contact members 20, 21, one on each flange. Each of these sets comprises a pair of contact springs 22, 23 of which the spring 23 is nearer the flange 15 and has a kink forming a bearing surface 24 which rides upwardly over the elements 12 if the latter should be on the outer side of the appropriate flange 15 when they pass the contacts. Thus upward movement of the member 23 forces two contact points 25, 26 on the springs 22, 23 against one another to complete an electrical circuit for the short period during which the operating element is under the bearing surface 24. If the operating element is made of conductive material, there may be provided two cooperating contacts between which the operating element passes so as to complete a circuit between the contacts. This avoids any necessity for completing a circuit through the operating element and its mounting, and hence avoids any necessity for a brush or the like on the movable carrier. The described arrangement, however, obviates any necessity at all for the electric circuit to be completed through the operating elements.

Figure 2:
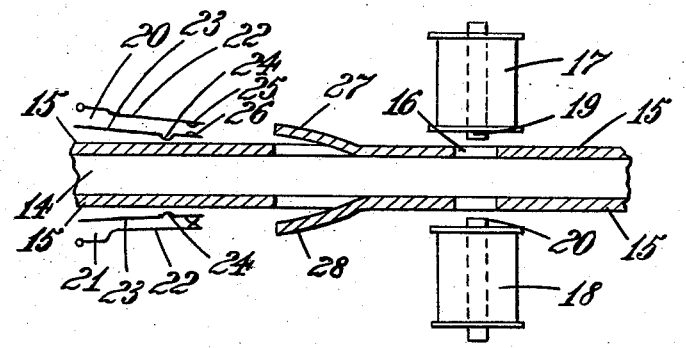
Figure 2 is a diagrammatic view, opened out flat, of part of the device of Figure 1 along the line 2—2 of Figure 1.

The biasing means heretofore mentioned comprises a mechanism for returning the elements 12 to their normal positions after they have passed the contacts 20, 21, the elements passing through another slot or slots in flanges 15. The biasing means may comprise a resilient portion of each element or a resilient mounting for each element arranged, if the element is not on the first side of said guide, to urge the element in a direction transversely to said slot so that it will pass through the slot when adjacent thereto. For example, each operating element may comprise a wire which may be sufficiently resilient so as to effect the necessary biasing. In another arrangement, the aforementioned biasing means comprises magnetic means, for example, an electro-magnet or permanent magnet arranged to urge said elements from said second side to said first side and disposed either adjacent said slot or adjacent a further slot between the contact or contacts and the first mentioned slot (considered in the direction of relative movement of the operating elements). In yet another arrangement, the aforementioned biasing means comprises an auxiliary guide for urging the elements through an opening in the guide from said second side to said first side, which opening may be constituted by said slot or by another separate slot between the contact or contacts and the first-mentioned slot (considered in the direction of relative movement of the operating elements). Such an arrangement is shown in Figure 2 wherein it is seen that between the contacts 20, 21 and the slots 16 are arranged a pair of auxiliary guides 27, 28 formed by outward deformation of parts of the flanges 15, these auxiliary guides serving to guide into the groove 14 any of the elements 12 which are lying outside the flanges 15 when they reach the auxiliary guides.

The rate storage device described above is employed for storing two sets of information, each set of pulses comprising the presence or absence of a pulse at regularly recurring time interval. The time instants associated with the two sets occur alternately. The pulses to be stored are applied to one or other of the electro-magnets 17, 18 according to which of the particular set the pulse to be stored belongs. Any pulse to be stored will thus operate the appropriate electro-magnet and thereby attract one of the operating elements 12 through the appropriate slot 16 so as to lie on the outer side of the appropriate flange 15. Thus, as indicated in Figure 1, some of the operating elements 12 lie on the outer sides of the flanges 15 and some inside the groove 14. When an element 12 lying on the outside of a flange 15 comes under one of the contacts 20 or 21 it will complete the electrical circuit through the contact points and thereby can be arranged to produce a pulse. It will thus be seen that the device serves to reproduce the stored pulses after an interval corresponding to the time of movement from the slots 16 round to the contacts 20, 21. It will be noted that the pulses to be stored must occur at the exact instant when the appropriate operating element is adjacent the slots 16. Provided the radio navigation position indicating apparatus, with which this storage device is to be used, only requires storage of information about the rate of occurrence of pulses (that is to say, in general, if the chart distance represented by each unit of information is very small) then the exact time of application of pulses to the drive for the indicating apparatus is not important. If the pulses from the radio navigation system to be stored by the storage device are not accurately timed with respect to the passage of the operating elements 12 past the slots 16 they may be arranged to operate a relay timing unit so that each pulse is stored by a relay for the necessary fraction of the interval between pulses and subsequently applied to the appropriate electro-magnet at the required instant. For this purpose each pulse may be made to operate a relay which prepares a circuit which circuit is then completed and, shortly afterwards, released by means of a contact on the member 10 or a relay controlled by such a contact. This auxiliary circuit can then be used for applying pulses to the electro-magnets 17, 18.

Figure 6:
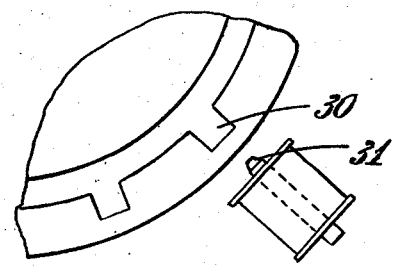
Figure 6 is a partial diagrammatic view similar to Figure 2 of a modification of the arrangement of Figures 1 and 2.

With the arrangement thus far described, after each operating element has passed the contacts 20, 21, it will be returned into the groove 14 by means of the auxiliary guides 27, 28. An alternative arrangement for returning the operating elements to the groove is illustrated in Figure 6 in which there is shown a second pair of slots 30 arranged between the contacts 20, 21 and the slots 16, the slots 30 being of sufficient radial depth to permit passage thereto of the operating elements 12. Disposed adjacent the outer side of the member 13 near the slots 30 is a magnet 31 which may be an electro-magnet or a permanent magnet, and which serves to attract the operating elements to lie centrally within the groove 14.

The rate storage device described above finds particular application in an indicating apparatus using the stepping motors to drive the index relative to the chart. Each stepping motor would normally be operated by a series of impulses derived from the radio navigation system. These impulses can be applied also to an associated rate storage device so that the latter will carry a record of the number of impulses (and hence of the number of steps of movement of the index) during an immediately preceding period of duration equal to the memory duration of the storage device. If there should be any interruption of received signals, then the impulses from the contacts of the rate storage devices are used for driving the appropriate stepping motors. It will be appreciated that, as a first approximation, the required rate of movement of the index during the interruption will be equal to that during the immediately preceding period, and hence the rate storage device will serve to move the index in accordance with the movement of the vehicle.

In indicating apparatus using impulse-operated stepping motors, as described above, it is convenient to apply impulses alternately to two motors for the two coordinate directions and in this case it is particularly convenient to use the form of rate storage device described above in which two different series of impulses are recorded on a single storage device.

The rate storage device must be brought into use in the indicating apparatus on the appropriate occasions when stored data must be used. For this purpose there may be provided means operative on a decrease of amplitude below a predetermined level of the received radio signals of the radio navigation system to bring into operation the rate storage device for providing substitute signals and also to complete simultaneously the circuit for feeding to said electro-magnetic means pulses corresponding to the reproduced stored pulses whereby the stored pulses are re-stored for a further cycle.

By this arrangement it is possible to keep the indicating apparatus operative for a period longer than one complete storage cycle of the rate storage device.

The indicating apparatus for indicating automatically the chart position of a vehicle from information received by a radio navigational system receiver in which this rate storage device is employed is shown diagrammatically in Figure 7. In that figure there is shown a radio navigation receiver 40 coupled to a receiving aerial for picking-up radio signals and controlling a pair of follow-up members 61 and 62 to produce a pair of outputs, through circuits 41 and 60, which are in the form of pulses representative of unit changes in two co-ordinates of the position of the receiver. This receiver may, for example, be of the kind described in Patent No. 2,530,903 in which there are produced two mechanical movements of indicating mechanisms having indicator pointers 63 and 64 representative of the changes in two co-ordinates of the position of the receiver. As is described, for example, in Patent No. 2,769,977 such indicating mechanisms may be connected, by means of suitable drive systems to chart indicating apparatus 47 which moves an index 67 relatively to a chart 68 so that the chart position of the index shows the position of the receiver. For the purposes of the present invention, the drive mechanism operates in discrete steps. This may readily be achieved, for example, by having the pair of follow-up members 61 and 62 associated with the two outputs of the navigation system receiver, arranged so that a discrete displacement of the indicator pointers 63, 64 in one direction or the other completes respective circuits through contacts 61', 62' of the associated follow-up member and thereby produces respective signals which, through servo-mechanisms 70, 71, displaces the follow-up members the appropriate amount in the appropriate direction so that it is then ready to detect the next discrete displacement of the indicator pointer. Servo-mechanisms of this character are well known and have long been used for like purposes; see, for example, U.S. Patents No. 2,388,609 and No. 2,582,588, the latter showing a follow-up system used in a radio navigational system and utilizing a follow-up member for the indicating pointer of a phase meter. Such a follow-up system in effect maintains the follow-up member in floating contact with the indicator pointer. The output signals of such a system are pulses which occur at irregular time intervals. The two outputs of leads 41 and 60 are applied to a timing unit 42 which, as described above, produces pulse signals at known regularly recurring time intervals, the presence or absence of a pulse indicating whether or not the chart index is to be moved a unit distance with respect to the chart in the appropriate co-ordinate direction. It will be appreciated that the unit distance is made very small so that it is hardly perceptible to the eye and thus this arrangement can be made to give a chart position indication in which the index appears to move continuously over the chart in accordance with the position determination. The two outputs from the timing unit 42 are normally applied, through change-over switches 43, 44 to two motors 45, 46 which drive the chart unit 47.

Referring to Figure 7, there is shown a relay timing unit as above described having respective relays 75, 76 coupled to the leads 41, 60. The relays 75, 76 are adapted to actuate respective pairs of normally open switches 77, 78 and 79, 80, of which the contacts 78, 80 are connected to a D.-C. voltage source. Additional relays 81, 82 are connected between the switches 77, 79 and respective normally closed switches 83, 84 adapted to be opened upon the relays 81, 82 being energized.

As shown, the switches 77, 79 are adapted when closed to connect the relays 81, 82 to a pulse shaping network 85 that is connected to an oscillator 86. The oscillator 86 is adapted, as at 87, to operate the constant speed drive 9. Also, the network 85 develops pulses for energizing the relays 81, 82.

The switch 77 is also shown to be connected to the switches 43, 48, and the switch 79 is connected to the switches 44, 49. Accordingly, when the switches 77, 79 are closed, pulses from the network 85 are applied, in the positions of the switches 43, 44, 48, 49 shown, to the solenoids 17, 18 and the motors 45, 46.

When signals applied through the leads 41, 42 cause the relays 17, 18 to be energized, the solenoids 17, 18 and motors 45, 46 can be operated only in response to the periodically recurring pulses from the network 85 applied through the switches 77, 48, 43 and the switches 79, 49, 44, and with which the operation of the constant speed drive 9 is synchronized.

Coupled to the receiver 40 is a signal strength discriminator 50 which comes into operation if the received signals should fall below a predetermined strength for any reason whatsoever. This signal strength discriminator is coupled to operate the switches 43, 44, 48 and 49 which serve to control the application of the pulses from the timing unit 42 to the motors 45, 46 and to the electro-magnets 17, 18. If the signal strength at the signal strength discriminator 50 should fall below the predetermined value, the switches 43, 44 are operated by the signal strength discriminator 50 so as to disconnect the inputs to the motors 45, 46 from the timing unit 42 and to apply instead signals from relay units 51, 52 respectively, which relay units are operated by the aforementioned contacts 20, 21 of the rate storage device. It will thus be seen that if the signal strength should fall below the predetermined value, the inputs from the timing unit 42 are disconnected from the motors 45, 46 and instead there are applied inputs from the contacts 20, 21 which represent the impulses stored previously on the rate storage device. The chart unit is thus operated in accordance with the stored impulses and thus the index is moved at the same rate as it has been moving during the last cycle of the rate storage device.

The signal strength discriminator is arranged, when it operates switches 43, 44, simultaneously to operate the switches 48, 49 to disconnect the electro-magnets 17, 18 from the timing unit 42 and to apply, to these electro-magnets, pulses from the relay units 51, 52 so that the rate storage device re-stores the output signals which it is providing to control the motors 45, 46. By this arrangement the stored pulses are re-applied to the electro-magnets 17, 18 and thus are stored again for a further period. The arrangement thus serves to store the information not only for one revolution of the element 10 but continuously so long as the device is maintained in operation. This arrangement will serve to keep the chart position indicator operating accurately for such time as the vehicle continues moving at the same rate in each of the two co-ordinate directions. In practice, any interruptions to the received radio navigation signals, e.g. interruptions due to static are almost invariably of very short duration and thus the rate storage device will serve to move the index on the chart unit correctly during any such interruption. In particular, it may be noted that if the apparatus is used with the radio navigation system of the aforementioned Patent No. 2,530,903 provided the index is within half a lane of its correct position, that is half a revolution of the indicator pointer of the receiver, then the index on the chart will move to its correct position on restoration of the received signals of the navigation system.

I claim:

1. In an indicating apparatus for radio navigation systems in which an index movement relative to a chart is effected in steps corresponding to signals provided by a radio navigation system receiver during its normal operation, the combination of: a storing means for storing for a given period the rate and direction of said steps during an immediately preceding period; and control means operating during times of signal failure of said radio navigation system receiver for switching the control of said index movement to said storing means for operation thereby in accordance with information stored in said storing means.

2. In an indicating apparatus for radio navigation systems in which an index movement relative to a chart is effected in steps corresponding to signals provided by a radio navigation system receiver during its normal operation, the combination of: a storing means for storing for a given period the rate and direction of said steps during an immediately preceding period; control means operating during times of signal failure of said radio navigation system receiver for switching the control of said index movement to said storing means for operation thereby in accordance with information stored in said storing means; and means responsive to operation of said control means for storing in said storing means during the immediately ensuing period information supplied by said storing means during said given period.

3. A combination as set forth in claim 1 which includes means for clearing said information from said storing means at the end of said given period.

4. In an indicating apparatus of the kind described, a rate storage device for producing impulses for a period at a rate corresponding to steps of movement of a control element during an immediately preceding period, comprising: a cyclically movable carrier; a plurality of operating elements mounted on said carrier for movement into and out of the plane of movement of said carrier; means for driving said carrier at a constant speed; a fixed separating guide disposed along the path of said elements in a position to engage said elements and prevent said movement of said elements relative to said plane of movement of said carrier, said guide having an opening permitting any element aligned therewith to be moved from one side to the other of said guide; electromagnetic means adjacent said opening for so moving an element aligned with said opening; biasing means for holding on one side of said guide all elements that are moved past said opening without being moved therethrough to said other side; and contact means spaced from said opening and positioned to be actuated by any of said elements disposed on said other side of said guide, whereby an electrical circuit is completed as each element on said other side of said guide engages said contact means thereby producing a pulse.

5. The combination set forth in claim 4 wherein said contact means are arranged just in advance of said opening.

6. The combination set forth in claim 4 wherein said carrier comprises a rotatable disc.

7. The combination set forth in claim 6 wherein said operating elements are disposed radially relative to said disc and are mounted thereon for movement in an axial direction.

8. The combination set forth in claim 7 wherein said elements are pivotally mounted on said disc for limited angular movement in radial planes containing the axis of said disc.

9. The combination set forth in claim 7 wherein said guide comprises an annular member surrounding said disc and having an inwardly directed groove along which the outer ends of said operating elements normally move, said opening being formed in one wall of said groove to permit each of said elements to be moved out of said groove and ride on the outer surface of said annular member.

10. The combination set forth in claim 9 wherein there are provided openings in both walls of said groove, and wherein two electromagnetic means are disposed on either side of said annular member for moving said operating elements through said openings in directions corresponding to selective energization of said two electromagnetic means.

11. The combination set forth in claim 4 wherein said biasing means comprise magnetic means arranged to urge said elements from said other side to said one side of said guide, said magnetic means being disposed adjacent a second opening in said guide located between said contact means and said first mentioned opening.

12. The combination set forth in claim 4 wherein said biasing means comprise an auxiliary guide for urging the elements through a second opening in said guide from said other side to said one side, said second opening being located between said contact means and said first mentioned opening.

13. The combination set forth in claim 4 wherein said contact means comprise a pair of normally open resilient contact members disposed to be moved to circuit closing position by engagement of one of said members by said operating elements as the latter are moved past said contact means.

14. The combination set forth in claim 4 wherein said operating elements are formed of ferromagnetic material, whereby said electromagnetic means may act directly on said elements.

15. In an indicating apparatus: a rate storage device as set forth in claim 4; a signal strength discriminator for connection to a radio navigation system receiver including a coordinate position indicator, said discriminator being operably responsive to a decrease of amplitude below a predetermined level of the received radio signals of the radio navigation system; and a switching means connected for operation by said discriminator to connect said contact means of said rate storage device to said coordinate position indicator to operate said indicator in accordance with signals supplied by said rate storage device.

16. In an indicating apparatus: a rate storage device as set forth in claim 4; a signal strength discriminator for connection to a radio navigation system receiver including a coordinate position indicator, said discriminator being operably responsive to a decrease of amplitude below a predetermined level of the received radio signals of the radio navigation system; a first switching means connected for operation by said discriminator to connect said contact means of said rate storage device to said coordinate position indicator to operate said indicator in accordance with signals supplied by said rate storage device; and a second switching means also connected for operation by said discriminator to connect said contact means of said rate storage device to said electromagnetic means for feeding to said electromagnetic means signals corresponding to the signals supplied to said coordinate position indicator, whereby said signals are re-stored for a further cycle.

No references cited.